United States Patent [19]

Kato

[11] Patent Number: 4,535,022

[45] Date of Patent: Aug. 13, 1985

[54] DECORATIVE TILE AND METHOD FOR MANUFACTURING THE SAME

[75] Inventor: Chizuo Kato, Tokyo, Japan

[73] Assignee: Aluteck Co., Ltd., Tokyo, Japan

[21] Appl. No.: 628,401

[22] Filed: Jul. 6, 1984

[30] Foreign Application Priority Data

Jul. 8, 1983 [JP] Japan .......................... 58-106186[U]
Feb. 15, 1984 [JP] Japan .......................... 59-26792
May 8, 1984 [JP] Japan .......................... 59-91643

[51] Int. Cl.³ .......................... B32B 3/30; B32B 17/06

[52] U.S. Cl. .......................... 428/142; 427/259; 427/287; 427/292; 427/404; 427/407.1; 427/423; 427/427; 428/209; 428/432; 428/457

[58] Field of Search ........ 428/209, 457, 462, 432–434, 428/142, 147, 148; 427/259, 292, 287, 404, 407.1, 422, 423, 427

[56] References Cited

U.S. PATENT DOCUMENTS

| | | | |
|---|---|---|---|
| 2,320,329 | 5/1943 | Meduna | 427/422 |
| 2,689,802 | 9/1954 | Korver | 427/404 |
| 2,993,815 | 7/1961 | Treptow | 428/209 |
| 3,025,182 | 3/1962 | Schrewelius et al. | 427/422 |

*Primary Examiner*—Paul J. Thibodeau
*Attorney, Agent, or Firm*—Scrivener Clarke Scrivener and Johnson

[57] ABSTRACT

Decorative tiles which may be bonded to the surfaces of columns and walls of a building are provided and a method for manufacturing the same is also disclosed. One surface of a tile blank made of a refractory material such as ceramic is coated with a metal layer by a metal spraying process so that a decorative tile looks gorgeous and even when a decorative tile is directly bonded to a concrete wall, it is not attacked or corroded.

4 Claims, 14 Drawing Figures

DECORATIVE TILE AND METHOD FOR MANUFACTURING THE SAME

BACKGROUND OF THE INVENTION

The present invention relates to decorative tiles to be bonded to walls so as to enhance the interior of a building, and to a method for manufacturing the same.

Decorative tiles which are bonded to the columns and walls of a building for decoration have been almost always porcelain tiles with various patterns and colors.

However the porcelain tiles have drawbacks that the manufacturing process is complicated and their costs are expensive because the procelain tile manufacturing process includes a step for treating tiles at high temperatures.

There has been proposed to use metal tiles instead of the procelain tiles, but they are expensive because their raw materials are expensive and the metal tile manufacturing process includes a complicated step of plating the metal tiles. Furthermore, the metal tiles have a drawback that they cannot be directly bonded to a concrete wall because they are attacked by alkaline liquids exuded from the concrete wall.

In view of the above, the present invention provides decorative tiles which can be directly bonded to concrete walls without the fear of corrosion, and a method for manufacturing the decorative tiles at less cost and in a simple manner without losing the luxuriousness and grandeur of metal tiles.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 5 to 14 are views used to explain the steps for manufacturing a decorative tile in accordance with a second embodiment of the present invention in which FIGS. 7, 9 and 14 are sectional views, on enlarged scale, of FIGS. 6, 8 and 13, respectively.

DESCRIPTION OF THE PREFERRED EMBODIMENTS

Figure 1:
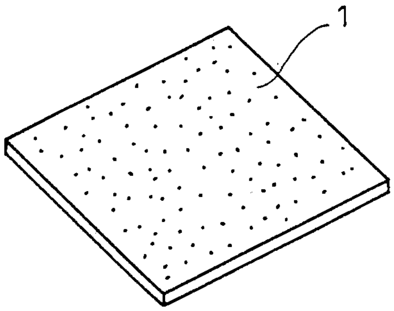
FIGS. 1, 2 and 3 are views used to explain the steps for fabricating a decorative tile in accordance with a preferred embodiment of the present invention.
Figure 2:
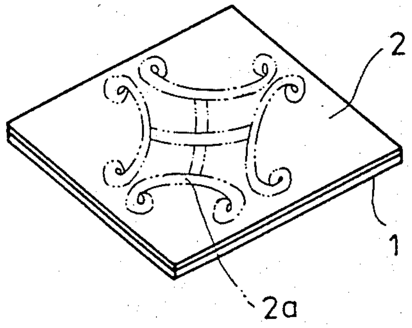
Figure 3:
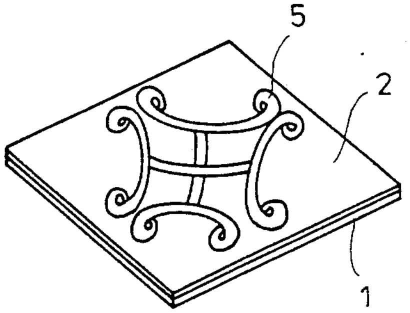
Figure 4:
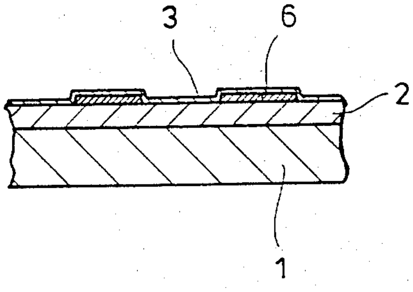
FIG. 4 is a sectional view of FIG. 3 showing the lamination of metal layers.
Figure 5:
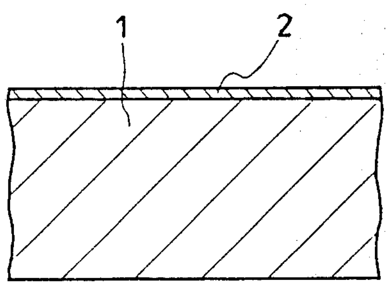
Figure 6:
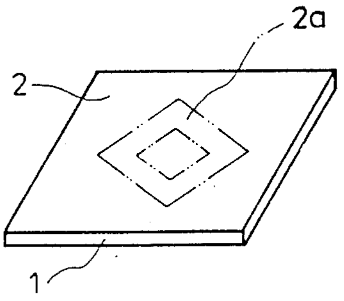
Figure 7:
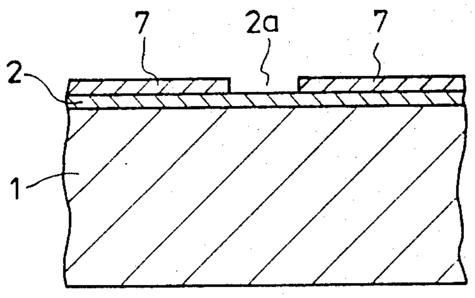
Figure 8:
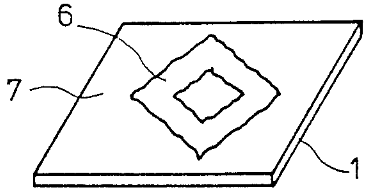
Figure 9:
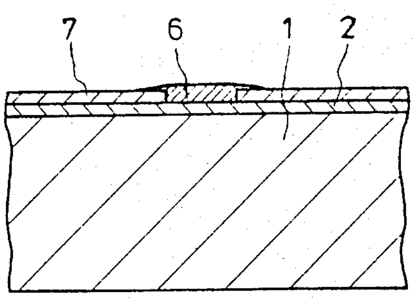

FIGS. 1 through 4 show a preferred embodiment of the invention in which abrasive particles are blown against a surface of a refractory tile blank 1 having a suitable shape (for example, a square shape as shown) so that the tile blank 1 has a roughened surface. A metal 2 is melted and sprayed over the roughened surface of the tile blank 1 (to the thickness of about 1.5–2 mm). Thereafter a resin paste is coated over the metal layer 2 except pattern portions *2a* and a bright metal such as brass, stainless steel or the like having a color different from that of the metal layer 2 is melted and sprayed over the pattern portions *2a*, whereby a pattern layer 6 is formed as shown in FIG. 3. After the pattern 5 has been produced by such screen prining process, the resin paste is removed from the surface of the metal layer 2 and the surfaces of the metal pattern layers 6 are polished. Thereafter the whole surface of the tile blank 1 is coated with a layer 3 of a transparent coating material so as to prevent the oxidation of the metal pattern layers.

A method for removing the resin paste from the surface of the metal layer 2 is to have the tile blank 1 immersed into a hot water bath so as to swell or soften the resin paste. This method is employed in the manufacture of a decorative tile in accordance with a further embodiment of the present invention to be described below with reference to FIGS. 5 to 14.

In this second embodiment of the invention abrasive particles are blown against a surface of a refractory tile blank 1 so that the tile blank 1 has a roughened surface which is coated with a metal layer 2 by a metal spraying process. A water soluble resin paste 7 is applied over the surface of the metal layer 2 except pattern portions *2a* by a screen printing process (See FIG. 7). After the resin paste 7 has been dried, a metal 6 having a color different from that of the metal layer 2 is melted and sprayed over the surface of the tile blank 1, whereby a pattern is formed by the lamination of the metal layers 2 and 6 (See FIGS. 8 and 9). The above-described steps are substantially similar to those of the first embodiment described with reference to FIGS. 1 to 4.

Figure 10:
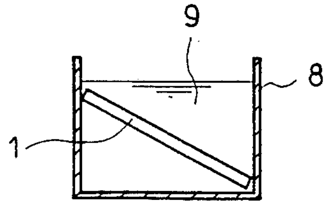
Figure 11:
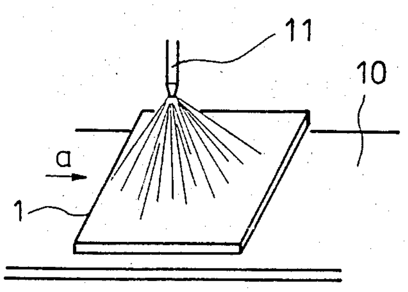
Figure 12:
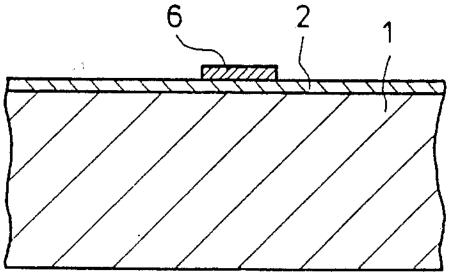
Figure 13:
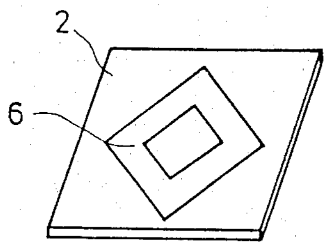
Figure 14:
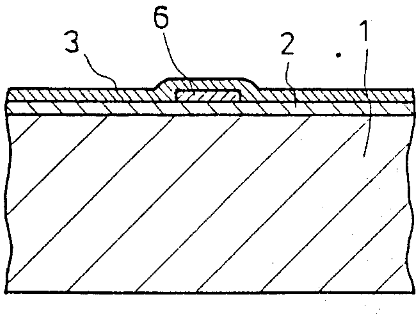

One of the features of the second embodiment resides in the fact that after the pattern or the pattern metal layers 6 have been formed, the tile blank 1 is immersed into a hot water bath 8 as shown in FIG. 10 so that hot water 9 causes the resin paste 7 to swell and soften. After the resin paste 7 is sufficiently swollen and softened, the tile blank 1 is taken out of the hot water bath 8 and placed upon a conveyor 10 which travels in the direction indicated by an arrow a in FIG. 11. While the conveyor 10 transports the tile blank 1, high-pressure and high-temperature hot water is blown through a nozzle 11 against the surface of the tile blank 1, whereby the resin paste 7 is removed from the surface of the metal layer 2. Therefore, the metal which adhered to the resin paste 7 is also removed (See FIG. 12).

After the resin paste 7 has been removed in the manner described above, the surfaces of the metal pattern layers 6 are polished, rinsed and dried. Thereafter, the surface of the tile blank 1 is coated with a layer of a resin or water glass coating material for prevention of the oxidation of the metal layers 2 and 6 (See FIGS. 13 and 14).

As described above, according to the second embodiment, the water soluble resin paste is applied over the surface of the metal layer 2 except the pattern portions *2a* and then another metal is melted and sprayed over the surface of the tile blank 1 so as to form a pattern. Therefore the adhesion of another or pattern metal to the surface except the pattern portions *2a* can be prevented and another or pattern metal which adhered to the resin paste 7 can be removed together with the resin paste 7 when high-pressure and high-temperature water is blown against the surface of the tile blank 1. As a result, only another or pattern metal layers *2a* remain on the tile blank 1. Thus, the pattern can be formed with a high degree of dimensional accuracy.

It is to be understood that the present invention is not limited to the preferred embodiments described above and that various medifications can be effected without leaving the true spirit of the present invention. For instance, the thickness of the first metal layer 2 can be increased or decreased depending upon a pattern and a desired strength of a decorative tile. The color of the first metal layer 2 is not limited to white and may have any color. Moreover, after the first metal layer 2 is formed, the surface of the first metal layer 2 may be polished and washed with hot water and applied with a suitable paste 7.

The effects, features and advantages of the present invention can be summarized as follows:

(I) The decorative tiles in accordance with the present invention can be manufactured in a simple manner without employing a complicated metal plating step. Furthermore, the quantity of metals used can be considerably decreased. As a result, the decorative tiles of the present invention are inexpensive.

(II) The tile blank has a roughened surface so that the molten metal sprayed strongly adheres to the surface of the tile blank. As a consequence, the metal layer will not be separated from the surface of the blank even when the metal layer is subjected to polishing step. When the thickness of the metal layer is thin, the surface of the metal layer also becomes a sand-like or pear-skin-like surface so that the surface quality is much enhanced. That is, the decorative tiles become more gorgeous and reposed or stable.

(III) The metal layer is coated with a layer of a coating material so that the luster of the metal layer can be maintained for a long period and the surface strength can be increased.

(IV) The back surface of the decorative tile is made of a ceramic or the like so that the decorative tile is prevented from being attacked even when it is directly bonded to a concrete wall.

(V) The method for manufacturing decorative tiles in accordance with the present invention does not include a high-temperature treatment step which is used in the case of the manufacture of porcelain tiles. As a result, the energy saving can be attained. Furthermore, the number of manufacturing steps is less. As a consequence, the decorative tiles of the present invention are inexpensive.

(VI) No inflamable material is used in the manufacture of decorative tiles of the present invention. As a consequence, the decorative tiles of the present invention are not inflamable and are therefore refractory.

(VII) A pattern appears in strong relief against the surface of the metal layer so that the decorative tiles of the present invention are very luxurious. Furthermore, even an unskilled person can produce a correct pattern is a positive manner.

(VIII) When a screen printing process is employed, not only a family crest or emblem but also various patterns may be formed.

What is claimed is:

1. A decorative tile comprising:

(a) a ceramic tile blank of desired shape having a roughened surface, (b) a first layer of metal spray-deposited on the roughened surface, (c) a second layer of metal attached to the first layer and being discontinuous with the first layer, thereby defining a decorative pattern on the first layer, and (d) a transparent coating material covering the roughened surface of the tile and the two layers of metal.

2. The method of manufacturing a decorative tile comprising the steps of:

(a) roughening a surface of a ceramic tile, (b) covering the roughened surface with a sprayed metal layer, (c) attaching to the metal layer a sprayed metal lamination which is discontinuous with the metal layer thereby forming a decorative pattern on the metal layer, and (d) covering the roughened surface, the metal layer and the lamination with a transparent coating.

3. The method according to claim 2, comprising the added steps of (a) forming a design on the sprayed metal layer, (b) covering all of the sprayed metal layer except the design area with a paste, (c) spraying the metal lamination onto the metal layer and the paste, and (d) removing the paste to expose the lamination on the design area.

4. The method according to claim 3, in which the paste is a material which is softened by hot water and is removed by immersing the tile in hot water and then subjecting it to a fluid under high pressure.

* * * * *